United States Patent
Suzuki et al.

(10) Patent No.: US 6,535,910 B1
(45) Date of Patent: *Mar. 18, 2003

(54) ELECTRONIC MAIL SYSTEM WITH MAIL CONTENT CLASS DESIGNATION

(75) Inventors: Tetsujiro Suzuki, Urawa (JP); Yuriko Kashu, Tokyo (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 82 days.

(21) Appl. No.: 08/764,509

(22) Filed: Dec. 12, 1996

(30) Foreign Application Priority Data

Jun. 13, 1996 (JP) .............................. 8-152650

(51) Int. Cl.$^7$ ............................... G06F 15/16
(52) U.S. Cl. ...................... 709/207; 709/200; 709/217; 709/238
(58) Field of Search .......................... 395/200.3, 200.7, 395/200.33, 200.34, 200.37, 200.43, 200.47, 200.68; 709/200, 240, 203, 204, 207, 210, 213, 217, 238, 219, 227, 232, 206

(56) References Cited

U.S. PATENT DOCUMENTS 5,740,231 A * 4/1998 Cohn et al. ................... 379/89

* cited by examiner

Primary Examiner—Jeffrey Gaffin
Assistant Examiner—Harold Kim
(74) Attorney, Agent, or Firm—Staas & Halsey LLP

(57) ABSTRACT

In an electronic mail system utilizing a computer network, the received mail is accumulated in a mailbox corresponding to the destination address mail ID for the purpose of management. Therefore, if the received mail exceeds the specified capacity of the mailbox, any additional mail is not accumulated and dispersed. The received mail is of varying type, having different application purposes. Mail having a specified application purpose may or may not be required to be accumulated, but if the mail is never received, the contents of the mail cannot be confirmed and it has been impossible to judge the necessity of accumulation of such mail. Electronic mail is identified as to its application purpose, and a mailbox is provided for accumulating mail for each mail ID preset for each user of the electronic mail system, and for each application class of mail content. A mail server stores and reads mail to and from the mailbox through designation of the mail ID and mail application class.

3 Claims, 7 Drawing Sheets

| 100 | 101 | 102 | 103 | 104 |
|---|---|---|---|---|
| Destination Address ID | Transmitting User ID | Mail Class | Title | Message |

FIG. 3

| 105 | 106 | 107 | 108 |
|---|---|---|---|
| ID | Mail Class | Mailbox Number | Mail Storing Directory |
| AAA1111 | Publicity Mail | 001 | /MAILBOX/AAA1111/PUB |
| AAA1111 | Private Mail | 002 | /MAILBOX/AAA1111/PRI |
| AAA1111 | Business Mail | 003 | /MAILBOX/AAA1111/BUS |

FIG. 4

| 108 | 109 | | 110 | 111 | 112 |
|---|---|---|---|---|---|
| No | Transmitting User ID | Mail Title | Read Flag | Starting Position | Ending Position |
| 01 | BBB2222 | Winter Gift is Welcome | Not yet read | 001 | 010 |
| 02 | BBB2222 | Year end special bargain sale | Already read | 011 | 024 |
| 03 | CCC3333 | Winter Bonus Sale | Not yet read | 025 | 033 |

FIG. 5

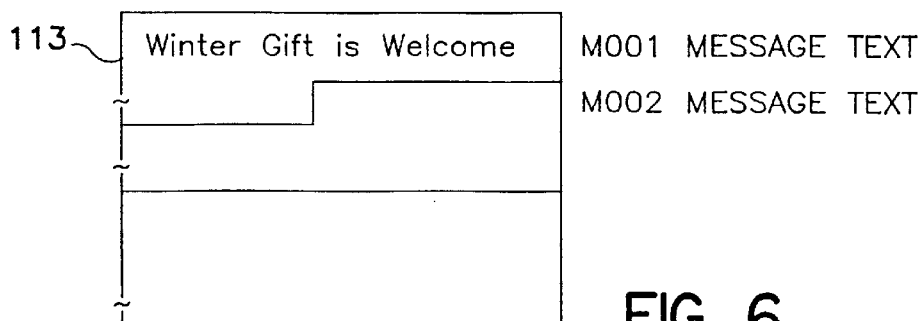

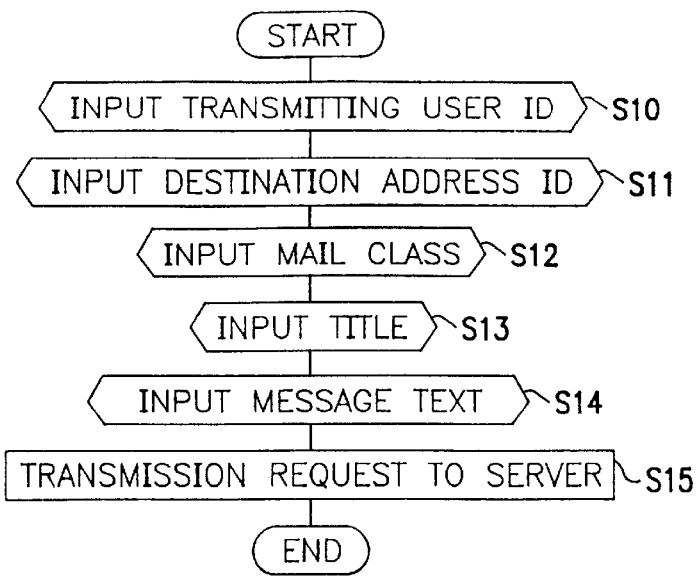

FIG. 8

| Publicity Mail |
|---|
| Transmitting: AAA1111<br>Destination<br>    Title: Winter Gift is Welcome<br>Mail Class: ☐Private ☐Business ■Publicity |
| Winter gift is welcome;<br><br>Now, winter gift is welcome<br><br>"Year end gift" for thanks to this year, "Christmas gift" for thanks to Christmas and "New Year gift" for wish to new year are ready, now. Sooner is best, because these gifts are limited in number.<br><br>The last days for sales of these gifts are as follows:<br><br>• Year end and Christmas gifts:   5 PM, 19th, Dec. (Tues.)<br>• New year gift:                         5 PM, 22nd, Dec. (Fri.) |

| | List Of Received Mail | | |
|---|---|---|---|
| No | Transmitting User ID | Title | Time & Date Of Transmission |
| 01 | BBB2222 | Winter Gift is Welcome | 1995.12.02 12:30:30 |
| 02 | BBB2222 | Year end special bargain sale | 1995.12.05 8:25:00 |
| 03 | CCC3333 | Winter Bonus Sale | 1995.12.10 18:40:30 |

FIG. 11

| Mail 1 | | | |
|---|---|---|---|
| Date: Wed, 20 Dec 95 12:30:30 | | Name of: Transmitting User | BBB2222 |
| Title: Winter Gift is Welcome | | Class: | Publicity |

Winter gift is welcome;

\<Now, winter gift is welcome\>

"Year end gift" for thanks to this year, "Christmas gift" for thanks to Christmas and "New Year gift" for wish to new year are ready, now. Sooner is best, because these gifts are limited in number.

The last days for sales of these gifts are as follows:

- Year end and Christmas gifts:  5 PM, 19th, Dec. (Tues.)
- New year gift:  5 PM, 22nd, Dec. (Fri.)

FIG. 12

FIG. 13
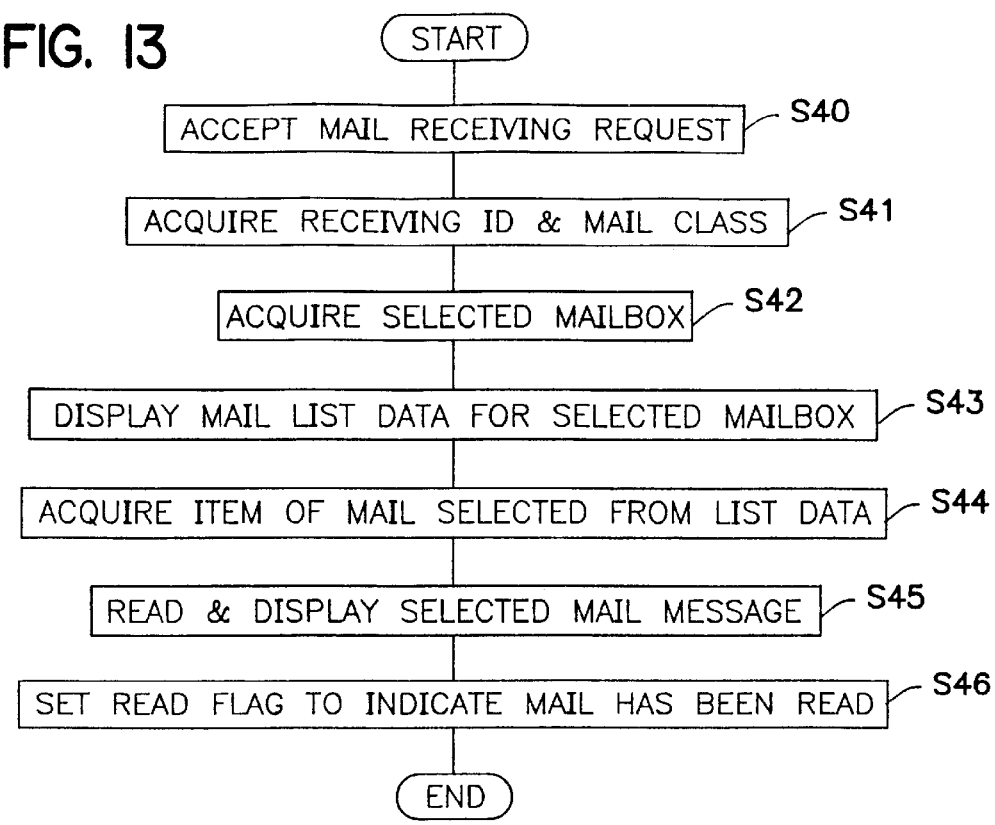
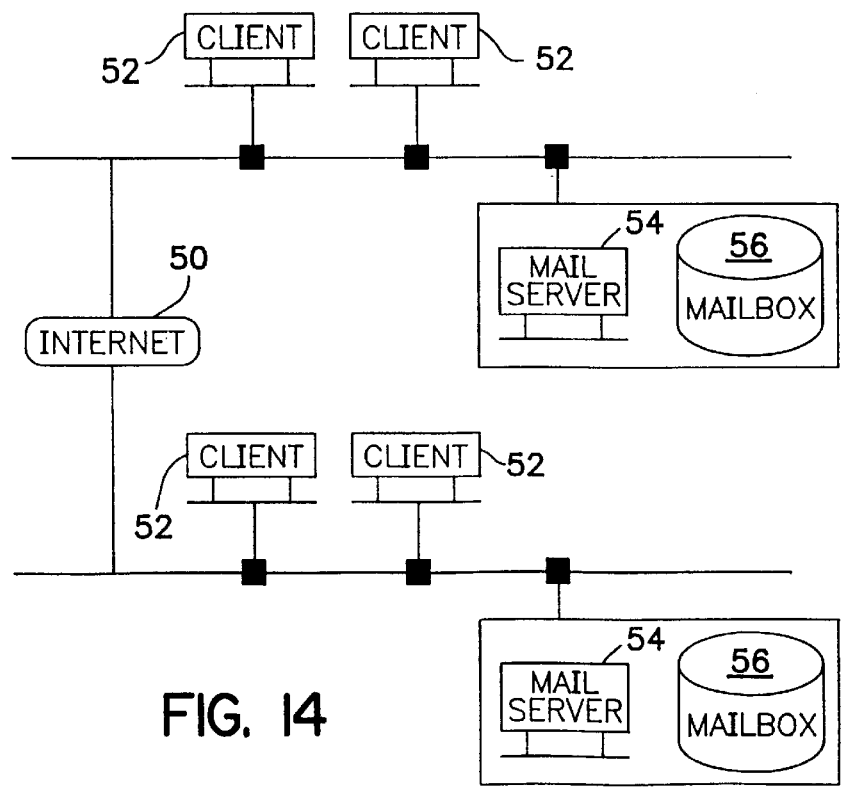
FIG. 14

ELECTRONIC MAIL SYSTEM WITH MAIL CONTENT CLASS DESIGNATION

BACKGROUND OF THE INVENTION

The present invention relates to control of a mailbox as a mail accumulating unit in an electronic mail system for exchanging information such as characters and voice in the form of electronic mail between terminals such as personal computers through a computer network.

In a conventional electronic mail system as shown in FIG. 16, upon issuance of a mail transmission request from a user, a mail server 30 accumulates mail in a mailbox 32 prepared for each user ID indicated in the destination address of the mail. A user can read the mail sent thereto from the mailbox 32 corresponding to the user ID. When a plurality of items of mail are accumulated in the mailbox 32, these are indicated in the form of a list, and the contents of the selected items of mail are read out. Since the mail server 30 is formed of an external memory, if the amount of mail exceeds the specified capacity of the mailbox 32, a portion of this mail is no longer accumulated and dispersed.

Electronic mail systems are used for a variety of application purposes and for private and business messages. Moreover, the same electronic mail can be transmitted to a plurality of destination addresses, due to the general address function in which the same mail can be stored in a plurality of mailboxes. As a result, an online shopping system provider can transmit electronic mail for product publicity (e.g., electronic mail advertisements) to a plurality of users.

In such conventional electronic mail systems, since a user receives electronic mail transmitted for various application purposes, it often happens that a large amount of electronic mail publicity or advertisements exceed the specified capacity of the user's mailbox, so that important mail other than publicity mail or advertisements cannot be received. Therefore, there is a need to avoid this non-receiving condition for electronic mail.

Moreover, a list of the received mail indicates only the titles of the mail received, resulting in a problem in that the application purpose and importance of the mail (e.g., business or advertising) cannot be understood until the mail is received and its contents checked.

SUMMARY OF THE INVENTION

It is an object of the present invention to overcome the above-described problems of prior art electronic mail systems.

FIG. 1 is a schematic diagram of a system in accordance with the present invention which solves the problems of prior art systems explained above.

In order to solve the above problems, the present invention provides an electronic mail system for exchanging electronic mail between terminals via a network 16, comprising mailboxes 20, 23, 24 for storing messages for each mail ID 21 and corresponding class 22 of mail content preset for each user of the electronic mail system. User terminals 10, 13 are mail terminals which have mail transmitting units 11, 14 for requesting transmission of items of mail by designating, at the time of electronic mail transmission, the mail ID 21 indicating the transmission destination address, the class 22 of mail content and the message content. A mail server 17 has a mail storing unit 18 to store items of mail in the mailboxes 20, 23, 24 corresponding to the mail ID and class of mail designated by the user terminal which transmits the mail. Moreover, the electronic mail system of the present invention also comprises user terminals having mail receiving units 12, 15 to request, at the time of receiving electronic mail, forwarding of mail to the mail server 17 by designating the mail ID 21 and class 22 of mail contents. The mail received from the server 17 is read out by a mail reading unit 19 which reads, upon reception of an instruction for the mail ID 21 and class 22 of the mail content, the mail from one of the mailboxes 20, 23, 24 corresponding to the designated mail ID 21 and class 22 of mail.

These together with other objects and advantages which will be subsequently apparent, reside in the details of the construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a diagram of a transmission mail format in accordance with the present invention;

FIG. 4 is a diagram illustrating the format of a mailbox management table in accordance with the present invention;

FIG. 5 is a diagram illustrating the format of a mail management table in accordance with the present invention;

FIG. 6 is a diagram illustrating the format of a message text table in accordance with the present invention;

FIG. 7 is a flow chart illustrating the processing which occurs in a mail transmitting unit in a user terminal in accordance with the present invention;

FIG. 8 is a diagram illustrating an example of a display screen designating transmission of electronic mail in accordance with the present invention;

FIG. 11 is a diagram illustrating a display screen listing received electronic mail in accordance with the present invention;

FIG. 12 is a diagram illustrating a display screen for received electronic mail in accordance with the present invention;

FIG. 13 is a flow chart for illustrating the processing performed by a mail reading unit of a mail server in accordance with the present claimed invention;

FIG. 14 is a block diagram of the system of the present invention as implemented utilizing the internet;

DETAILED DESCRIPTION OF THE PREFERRED EMBODIMENTS

A preferred embodiment of the present invention will be explained below with reference to the accompanying drawings.

Figure 1:
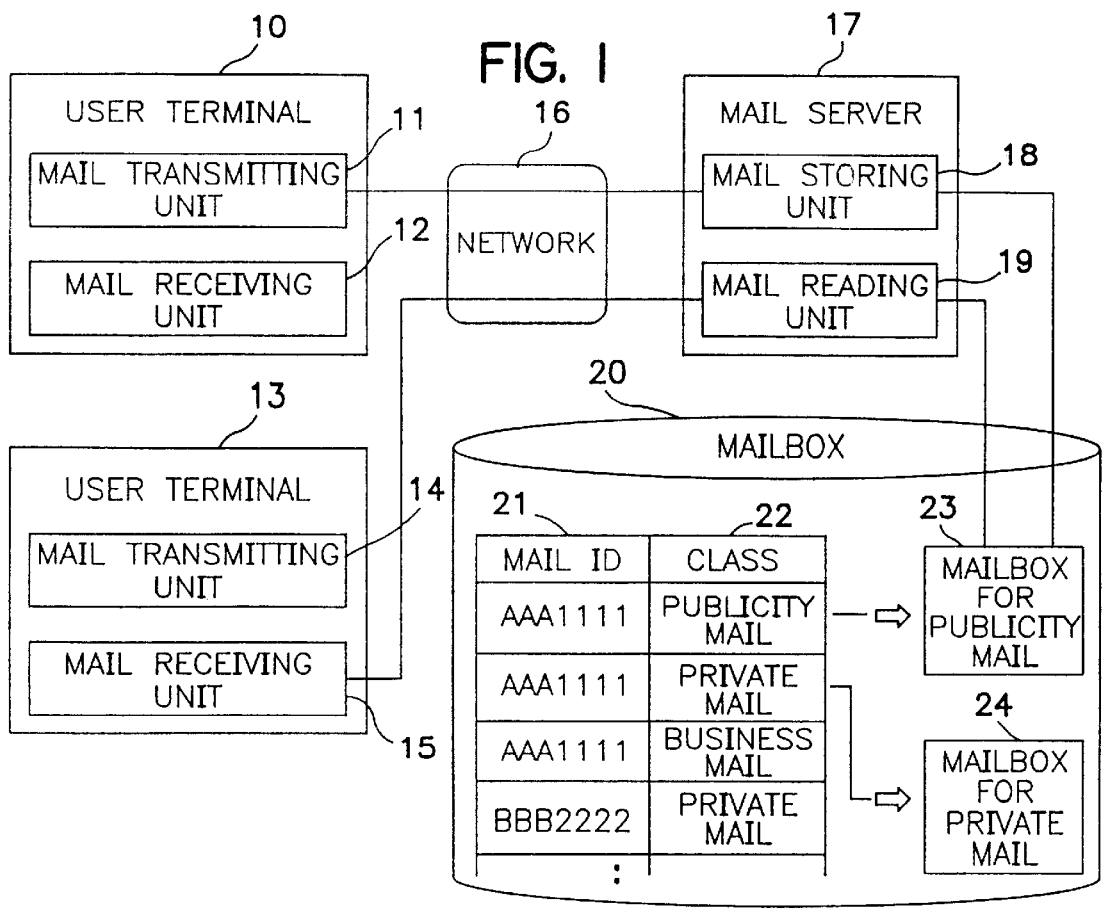
FIG. 1 is a block diagram of an electronic mail system in accordance with the present invention.

FIG. 1 is a block diagram of the system of the present invention, composed of user terminals 10, 13 which are mail terminals for instructing transmission and reception of electronic mail, and a mail server 17 for processing electronic mail on the basis of the instructions issued from the user terminals 10 and 13.

The mail server 17 transmits and receives electronic mail based on instructions from the user terminals 10 and 13. The server 17 has a mailbox 20 for accumulating a plurality of items of electronic mail. The mailbox 20 is provided on a storage device of the mail server 17 to store the mail requested to be transmitted and to identify the user ID. For example, a subdirectory is set for each user ID under the control of the mail storage directory in order to store a data file for each class of mail received under the control of the subdirectory. The mailbox 20 accumulates and holds the mail for each mail ID 21 as the electronic mail destination address and class 22 of mail. Since the mailbox 20 is classified for each category or class of mail, the number of items of mail which can be accumulated in the mailbox can also be changed depending on the application purpose. Therefore, a user is capable of making reference to only the most recent mail having higher priority by setting the number of items of mail to be accumulated in the mailbox, which have a lower priority to a value lower than that of another mailbox, depending on the class of mail application.

A user who desires transmission or reception of electronic mail issues an instruction for transmission or reception of electronic mail to the mail server 17 from a terminal 10. For the transmission of electronic mail, a user provides a mail ID to the mail transmitting units 11, 14 of the terminal 10. The mail ID is an identifier indicating a destination address of the mail, a mail class indicating the application of the mail and a message. The mail transmitting unit 11 transmits the contents provided by the user to the mail server 17 through the communication network 16. The mail server 17 stores, on the basis of the contents, the mail in the mailboxes 23, 24 corresponding to the mail ID 21 which is an identifier indicating the destination address and class of mail 22.

For the reception of electronic mail, the identifier indicating the destination address of an item of mail as the reception object and a class of mail indicating a mail application are provided to mail receiving units 12, 15 of the user terminals 10 and 13. The mail receiving units 12 and 15 send the provided content to the mail server 17 via the communication network 16. The mail server 17 reads the electronic mail message from the mailboxes 23, 24 corresponding to the mail ID 21 which is an identifier indicating destination address and the class 22 of mail on the basis of the notified content. The server 17 then sends the message read out to the mail receiving units 12, 15 of the terminals 10 and 13. When a plurality of items of mail exist within one mailbox, only management data, such as the titles of the items of mail, the names of originators or the like is transmitted. The user terminals 10 and 13 display the lists on the basis of the data transmitted. Next, the mail server 17 outputs the text of the mail to be received by the terminals 10 and 13 to send the text of the mail selected from the list to the specified user terminal.

Figure 2:
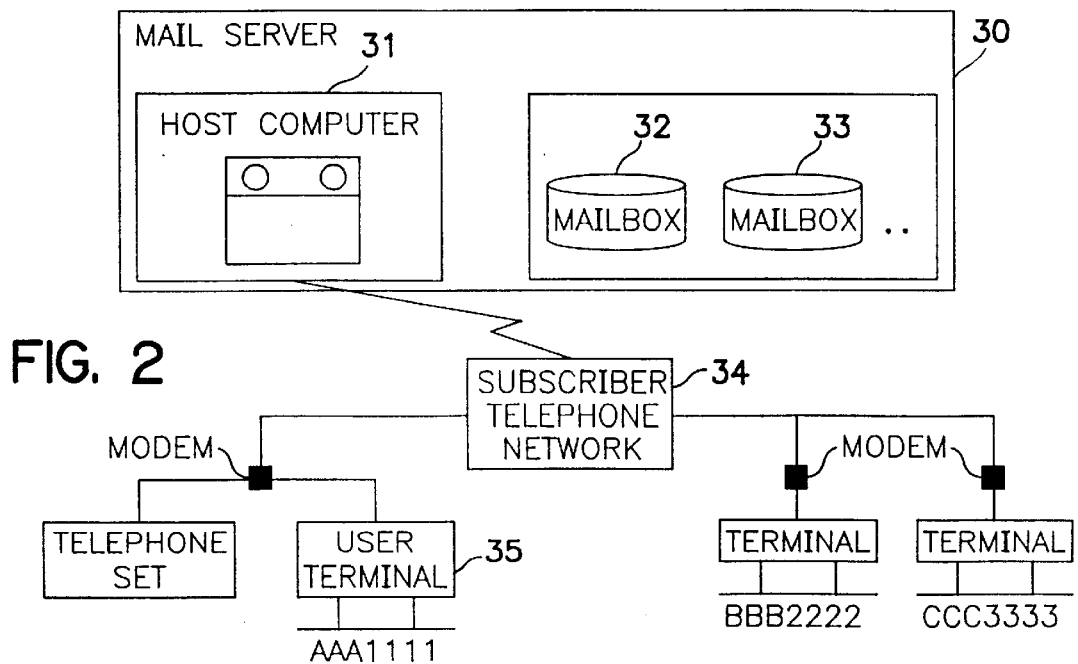
FIG. 2 is a block diagram of the system of the present invention as implemented using a general purpose computer.

FIG. 2 is a block diagram of an embodiment of the present invention as implemented utilizing a general purpose computer. An electronic mail system user notifies a mail server 30 of a personal computer communication company of transmission and reception of electronic mail via a terminal 35 coupled to the subscriber telephone network 34. The mail server 30 is controlled by its host computer 31, and transmission and reception of electronic mail instructed from the user terminal 35 is executed under the control of the host computer 31 through storing and reading operations to and from mailboxes 32, 33 . . . for each class of mail.

Next, the formats of electronic mail and the mailboxes will be explained with reference to FIG. 3 to FIG. 7. As shown in FIG. 3, an electronic mail format includes a destination address ID 100 for electronic mail transmission, a transmitting user ID 101 which is an address for identifying a user as a mail originator, a mail class 102, a title 103 and a message 104. A mail class 102 indicates a mail application, which is set to "Business" for business communications, or to "Publicity" for the guidance of online shopping, or to "Private" for private communications.

As the class setting, the data "01", for example, may designate "Business" mail, while "02" may designate "Publicity" mail and "03" may designate "Private" mail. Classification of mail is not limited to the above classifications, and it is of course possible to classify the mail with a fewer or greater number of classifications. For example, two mailboxes for "Business" and "General" mail may be provided. In addition, it is also possible that a class may be set, for example, only to "Business" while other applications are set up as one class. Alternatively, if classes are not set up, mail may be controlled to be stored automatically in another mail box corresponding to the "Ordinary" class.

The mailbox in the mail server is constituted as shown in FIG. 4 to FIG. 6. The present invention will be explained using an example where the mail contents are stored in different mailboxes for each electronic mail destination address and class of mail. FIG. 4 illustrates a mailbox management table for management of each mailbox to be used for management of an identifier indicating the destination address of electronic mail, a mailbox number corresponding to a class of mail and a position of a data file storing a message. This table is used for management of a mailbox number 107 corresponding to a mail address ID 105, a mail class 106 and a storing directory 108 for the corresponding external memory. The mail storing directory 108 sets the subdirectory for each mail address ID 105 under the control of the mailbox directory and moreover sets the directory name in which the data file is stored for each mail class 106. In FIG. 4, "MAILBOX" corresponds to a mailbox directory name, "AAA 1111" corresponds to a subdirectory name for each mail address ID 105 and "PUB", "PRI" and "BUS" corresponds to data files of a message text table for storing messages for publicity, private and business mail, respectively. The message text for each mail address ID 105 and mail class 106 can be managed by storing the message text in each data file.

Next, the format of each mailbox will be explained. Each mailbox is composed of a stored electronic mail management table and a message text table for storing a mail message text. FIG. 5 illustrates a format for managing electronic mail in the mailbox. For all mail in the mailbox, a mail title 109, a flag 110 indicating whether the mail has been read out, a starting position 111 in the message text table and an ending position 112 are set for each item of mail. When a plurality of items of mail exist within the mailbox, the content of this mail management table is sent to the user terminals for display as a list.

FIG. 6 illustrates a format of the message text table. Each data file located in the position designated by the mail storing directory designated in FIG. 4 ("PUB", "PRI" and "BUS" under the control of "/MAILBOX/AAA1111") corresponds to this table. The data representing the text of each message is stored in the message text table, at the position corresponding to the starting position 111 and the ending position 112 identified by the mail management table.

Next, the electronic mail transmitting process will be explained on the basis of an example of transmitting publicity mail to "AAA1111" from the user ID "BBB2222" by referring to FIG. 7 to FIG. 9. FIG. 7 illustrates a processing flow in the mail transmitting unit 11 of the user terminal 10. For the transmission of electronic mail, a user designates "BBB2222" as the electronic mail user ID (S10) as an originator to the electronic mail transmitting unit 11 in the terminal. Then, the user designates "AAA1111" as the electronic mail address (S11) for the electronic mail. The user designates "01" to indicate publicity as the class of mail corresponding to the content thereof (S12), and designates "Winter Gift is Welcome" as the title (S13) and also designates the message text (S14). It is also possible to designate the above items by preparing an electronic mail transmitting display as shown in FIG. 8 within the electronic mail transmitting unit 11. An example of mail as shown in FIG. 8 is prepared as publicity mail in which the transmitting address mail ID and mail title are input, publicity is designated as the class of mail, and transmission of message text is also designated. As explained with reference to FIG. 8, the class of mail is selected from among the categories of private, business and publicity, and moreover, it may also be designated directly by a user. The electronic mail transmitting unit 11 generates an electronic mail message based on the content instructed and transmits this mail to the mail server 17 (S15).

Figure 9:
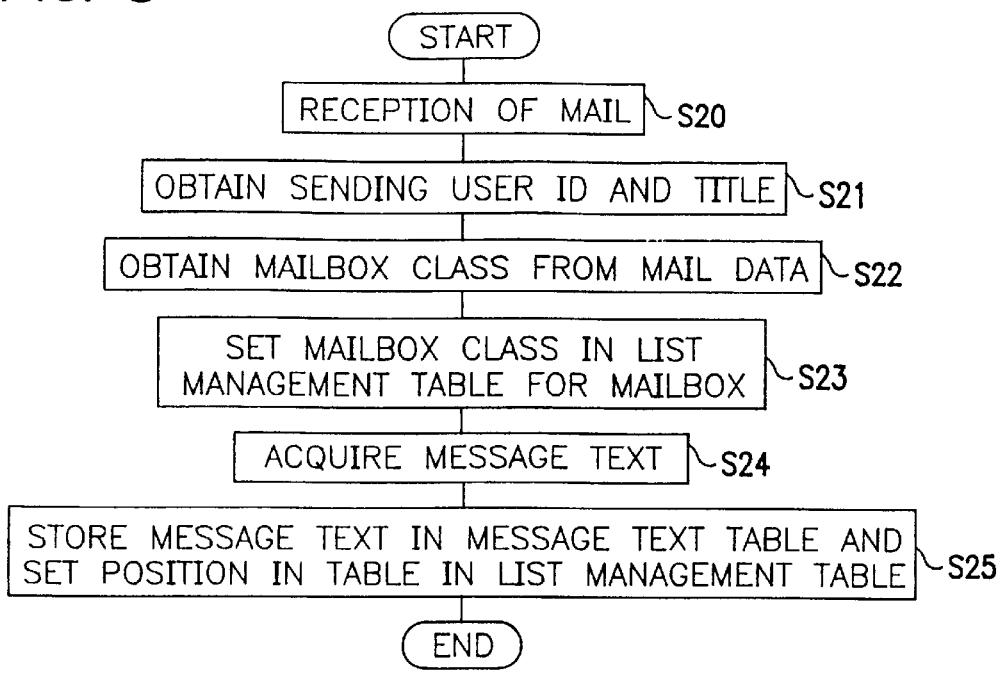
FIG. 9 is a flow chart illustrating the processing performed by a mail storing unit of a mail server in accordance with the present invention.

The flow of the message storing process in the mail server 17 which has received a transmission request, is shown in FIG. 9. Upon reception of an electronic mail message from the user terminal 10 (S20), the mail server 17 obtains the sending user ID, title, mail address ID and class of mail (S21 and S22) and refers to the mailbox management table shown in FIG. 4 to identify the mailbox corresponding to the ID and class of mail. In this example, since "AAA1111" is designated as the mail address ID and "Publicity" is designated as the class of mail, the mailbox number is designated as "001". Next, the message text is stored in the corresponding mailbox. The transmitting user ID and title are stored (S23) in the mail management table of FIG. 5 and the message is stored in the message text table of FIG. 6 (S24, S25). The message text of the mail is stored in an unused area of the message text table and the starting/ending positions and the flag which identifies that the mail is not yet read out, are set in the mail management table of FIG. 5.

Figure 10:
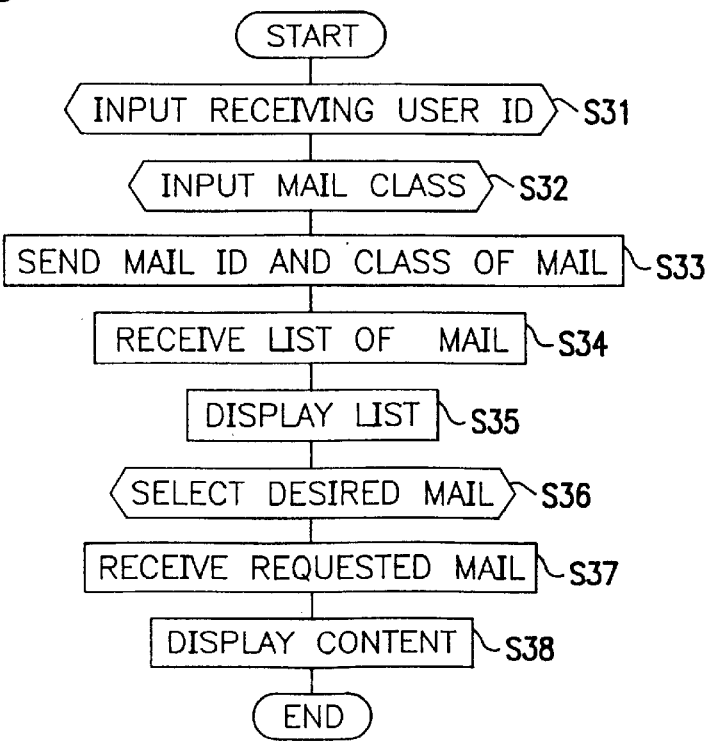
FIG. 10 is a flow chart illustrating the processing of a mail receiving unit of a user terminal in accordance with the present invention.

Next, the electronic mail receiving process will be explained by referring to FIG. 10 to FIG. 13 based on an example of receiving mail for which the user ID "AAA1111" is stored in the mailbox. FIG. 10 is a flow chart for the processing flow in the mail receiving unit 15 of the user terminal 13. For the reception of an electronic mail message, a user instructs a class of mail based on the electronic mail ID and mail content of the user to the electronic mail receiving unit 15 in the terminal 13 (S31, S32). It is also possible to designate reception by generating an electronic mail receiving display as shown in FIG. 11 and FIG. 12 in the electronic mail receiving unit 15. The electronic mail receiving unit 15 sends the mail ID and class of mail to the mail server 17 (S33) with the designations shown in FIG. 11 on the receiving display. When a data list of the mail documents in the corresponding mailbox is received from the mail server 17 (S34), a list is displayed (S35) as shown in FIG. 11, and the user is requested to select the desired mail (S36). When the mail receiving unit 15 selects, for example, the mail "01", it receives the content of the text of the message "Winter Gift is Welcome!" of mail "01" from the mail server 17 (S37). The mail content transmitted is displayed in the electronic mail receiving unit 15 (S38) with the display screen of FIG. 12.

Next, processing in the mail server 17 will be explained with reference to the flow chart of FIG. 13. Upon reception of a request for receiving electronic mail from a user terminal 13 (S40), the mail server 17 acquires the receiving ID and mail class based on the format shown in FIG. 3 (S41). The server 17 refers to the mailbox management table shown in FIG. 4, identifies the mailbox corresponding to the ID and mail class (S42) and sends mail list data for the selected mailbox (S43). When the particular item of mail selected from the list is sent from the terminal 13, the mail server 17 refers to the message text table to read the message corresponding to the selected mail (S44) and then sends this message to the user terminal 13 (S45). For the mail read out, the read flag in the mailbox management table (FIG. 5) is set to indicate that the mail has been read.

Figure 15:
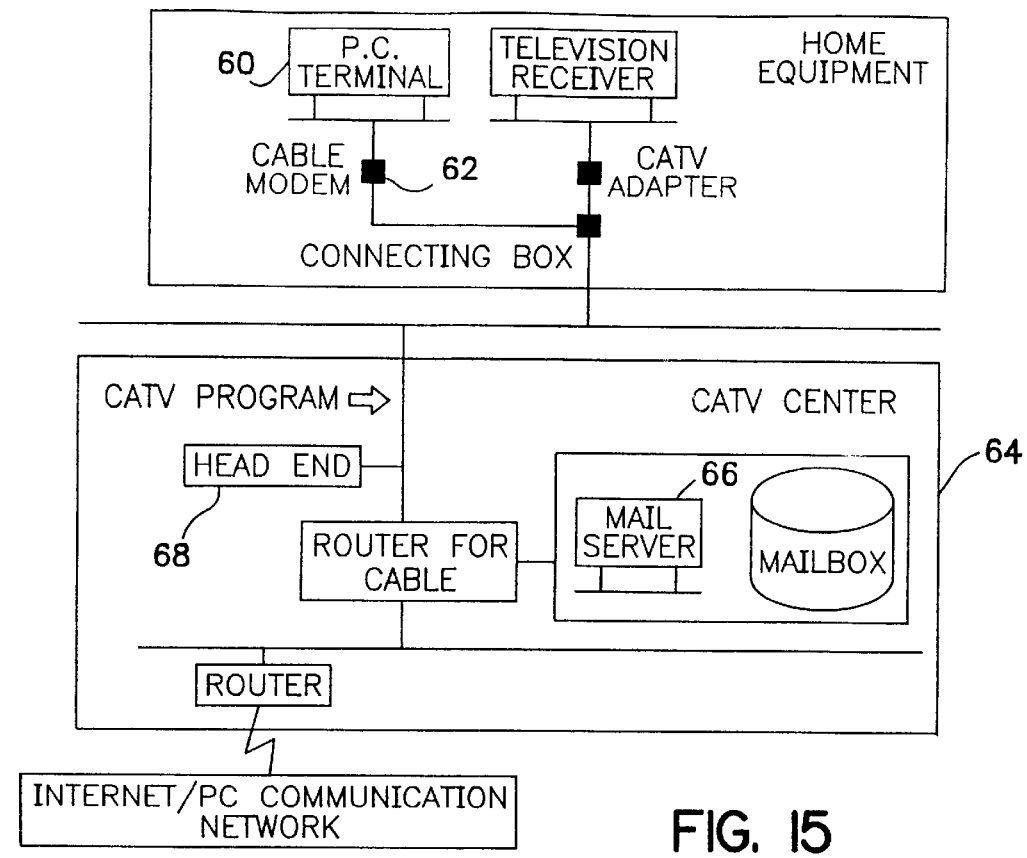
FIG. 15 is a block diagram of the system of the present invention as implement utilizing a cable television network.
Figure 16:
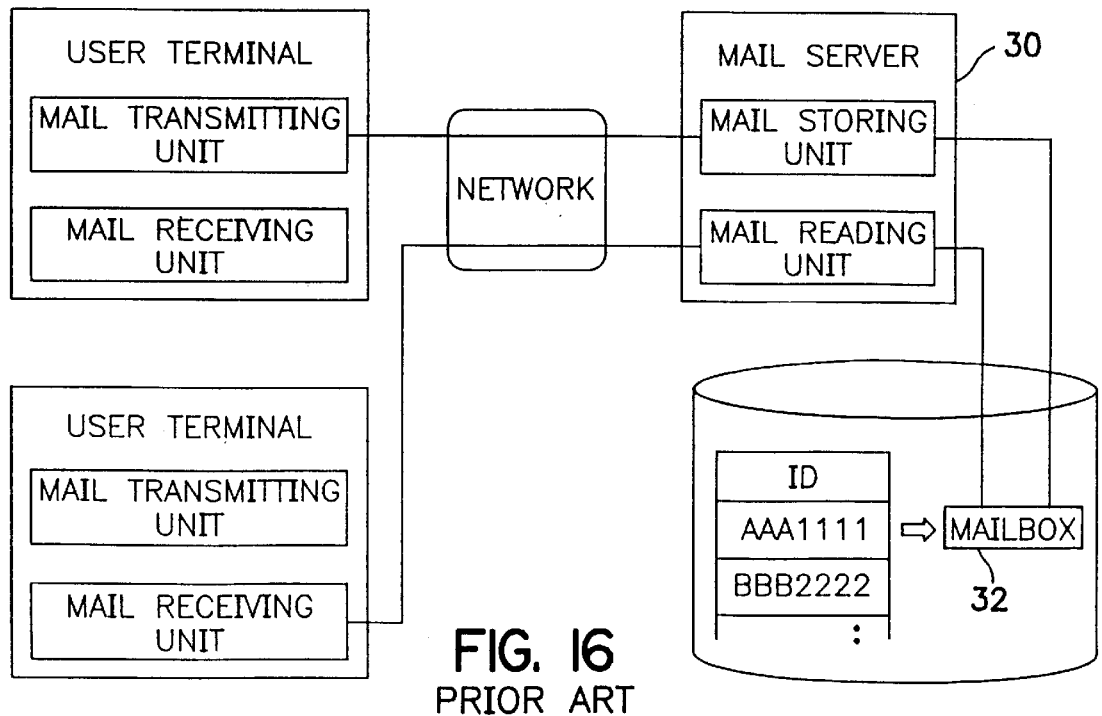
FIG. 16 is a block diagram of a prior art electronic mail system.

An example of an electronic mail system utilizing a general purpose computer has been explained above, and this electronic mail system may be replaced with a system utilizing the internet or a CATV network as shown in FIG. 14 and FIG. 15. The only requirement is that the system accumulate electronic mail by writing into the mailbox based on each address and then read the mail based on the instruction issued.

In an electronic mail system utilizing the internet 50 shown in FIG. 14, when a company user or client 52 desires, for example, to make contact with the internet 50 from a private LAN, a mail server 54 is provided within the private network. The mail server 54 is used for accumulation and management of mail for each destination address. Therefore, different mailboxes 56 may be used for various types of business, and application efficiency of the electronic mail system can be enhanced by implementing the mail server 54 with the present invention. Moreover, when a personal user desires to make contact with the internet 50 from the access point of a commercial internet provider, he can use different mailboxes for each class of mail by utilizing the present invention, because the mail server 54 is provided by the commercial internet provider.

In an electronic mail system utilizing a CATV network as shown in FIG. 15, a personal computer is connected as a terminal and communication can be carried out by utilizing available space on a part of the CATV network. The personal computer 60 used as a terminal is provided with a LAN board and is connected to a CATV network through a CATV communication apparatus 62 (such as a cable modem, or the like). Within a CATV center 64, a server 66 is provided in combination with a head end 68 for distributing the CATV programs, and the personal computer terminal 60 is provided with an application of transmission control protocol/internet protocol (TCP/IP) for LAN. As a result, the P.C. terminal 60 can operate as a client of the server 66. Accordingly, different mailboxes may be used for each type of business content in order to realize high application efficiency for an electronic mail system by installing the mail server 66 in the CATV center 64 and implementing the present invention. Particularly, since management of both CATV users and electronic mail users can be realized at the CATV center 64, electronic mail may be transmitted to CATV subscribers.

As explained above, the present invention enables reception of electronic mail based on its application purpose, and the mail can be stored in different mailboxes based on its application, at the time of transmitting the electronic mail.

Therefore, when the number of electronic mail messages to be received is determined for each mailbox, the mail to be received can be designated for each application. If electronic mail messages are frequently transmitted or received, the mail can be received based on application importance and receiving frequency through the receiving process, and based on the application purpose, so that highly efficient electronic mail processing can be realized.

Since the contents of electronic mail cannot be known from only the titles displayed in the list of mail received, the application purpose for each item of mail is also stored in the mailboxes for each application purpose. As a result, electronic mail may be received selectively depending on its importance to the user, which can be understood from its application purpose.

The many features and advantages of the invention are apparent from the detailed specification and thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, as falling within the scope of the invention.

What is claimed is:

1. An electronic mail system comprising:

a mailbox storing messages for each of a plurality of mail IDs and each of a plurality of mail content classes which corresponds to each user of said electronic mail system;

a terminal having a mail transmitting unit transmitting an item of mail including a mail ID which is one of the plurality of mail IDs, a mail content class which is one of the plurality of mail content classes and a mail receiving unit receiving a message from a list of a plurality of items of mail, each of which has a corresponding mail ID and a corresponding mail content class; and a mail server having a mail storing unit storing the message transmitted from said terminal into said mailbox corresponding to the mail ID and the mail content class transmitted by said terminal, and having a mail reading unit reading the messages from said mailbox corresponding to a designated mail ID and a mail content class and transmitting the list of a plurality of items of mail, wherein:

the number of messages stored in said mailbox, for a specific one of the plurality of mail content classes, may be limited; and said mailbox for each mail content class includes at least a publicity mailbox and a private mailbox.

2. An electronic mail system according to claim 1, wherein said terminal includes a mail receiving unit receiving mail by providing a mail ID and mail content class to said mail server, and wherein said mail server includes a mail reading unit reading messages from said mailbox corresponding to the designated mail ID and mail class.

3. A mail server used for accumulation and management of mail in an electronic mail system, comprising:

a mailbox storing messages for each of a plurality of mail IDs and each of a plurality of mail content classes corresponding to each user of the electronic mail system;

a mail storing unit storing, upon reception, mail including a corresponding mail ID, a corresponding mail content class and a message into the corresponding mailbox for the corresponding mail ID and the corresponding mail content class; and a mail reading unit reading, upon reception of designation of one of the mail IDs and one of the mail content classes, a message from said mailbox corresponding to the designated mail ID and the designated mail content class, wherein:

the number of messages stored in said mailbox, for a specific one of the plurality of mail content classes, may be limited; and said mailbox for each mail content class includes at least a publicity mailbox and a private mailbox.

* * * * *

UNITED STATES PATENT AND TRADEMARK OFFICE
CERTIFICATE OF CORRECTION

PATENT NO.      : 6,535,910 B1
DATED           : March 18, 2003
INVENTOR(S)     : Tetsujiro Suzuki et al.

It is certified that error appears in the above-identified patent and that said Letters Patent is hereby corrected as shown below:

<u>Title page,</u>
Item [56], U.S. PATENT DOCUMENTS, please insert the following:
--     5,377,354     12/1994     Scannell et al.
       5,715,397     2/1998      Ogawa et al.
       5,621,727     4/1997      Vaudreuil --
Insert the following after last U.S. PATENT:
-- OTHER PUBLICATIONS
"Use of Pre-processing for Electronic Mail Baskets," IBM TDB, vol. 35 no. 1a, p. 395-396.            6/1992
"Categorizing Incoming Mail," IBM TDB, vol. 35 no. 3, p. 228-230
           8/1992
"Categorical Storage of Voice Mail Messages," IBM TDB, vol. 36 no. 6b, p. 169-170
           6/1993 --

Signed and Sealed this

Fifth Day of August, 2003

JAMES E. ROGAN
*Director of the United States Patent and Trademark Office*